United States Patent
Wei et al.

(10) Patent No.: US 11,451,404 B2
(45) Date of Patent: Sep. 20, 2022

(54) BLOCKCHAIN INTEGRATED STATIONS AND AUTOMATIC NODE ADDING METHODS AND APPARATUSES

(71) Applicant: ALIPAY (HANGZHOU) INFORMATION TECHNOLOGY CO., LTD., Zhejiang (CN)

(72) Inventors: Changzheng Wei, Hangzhou (CN); Ying Yan, Hangzhou (CN); Hui Zhang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/361,030

(22) Filed: Jun. 28, 2021

(65) Prior Publication Data

US 2021/0328813 A1 Oct. 21, 2021

(30) Foreign Application Priority Data

Jul. 8, 2020 (CN) .......................... 202010652952.7

(51) Int. Cl.
*H04L 9/32* (2006.01)
*H04L 9/00* (2022.01)

(52) U.S. Cl.
CPC ............ *H04L 9/3265* (2013.01); *H04L 9/321* (2013.01); *H04L 9/50* (2022.05)

(58) Field of Classification Search
CPC .... H04L 9/3265; H04L 9/321; H04L 2209/38
(Continued)

(56) References Cited

U.S. PATENT DOCUMENTS 5,530,934 A * 6/1996 Hilton ................. G06F 12/0653
711/2
9,292,523 B1 * 3/2016 Todd ....................... G06F 16/13
(Continued)

FOREIGN PATENT DOCUMENTS

CN 106301792 1/2017
CN 107171829 9/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Venkat Perungavoor
*Assistant Examiner* — Peiliang Pan
(74) *Attorney, Agent, or Firm* — Fish & Richardson P.C.

(57) ABSTRACT

A blockchain integrated station receives a configuration instruction after accessing a blockchain network. The blockchain integrated station configures, based on the configuration instruction, a first network address corresponding to a certificate authority center and a second network address corresponding to a first blockchain node in the blockchain network. The blockchain integrated station initiates an authentication request to the certificate authority center based on the first network address. The blockchain integrated station receives, from the certificate authority center, a digital certificate after the certificate authority center determines that the authentication request passes verification. The blockchain integrated station sends, based on the second network address, the digital certificate to the first blockchain node, where the digital certificate is used by the first blockchain node to add the blockchain integrated station as a new blockchain node in the blockchain network.

20 Claims, 5 Drawing Sheets

(58) Field of Classification Search
USPC .......................................................... 713/168
See application file for complete search history.

(56) References Cited

U.S. PATENT DOCUMENTS

| | | | |
|---|---|---|---|
| 10,123,202 B1 | 11/2018 | Polehn et al. | |
| 10,824,684 B2 | 11/2020 | Pennell et al. | |
| 10,958,450 B1 | 3/2021 | Yamada | |
| 11,050,763 B1 | 6/2021 | Lyle et al. | |
| 11,159,609 B2 | 10/2021 | McGrath et al. | |
| 2003/0188161 A1* | 10/2003 | Ndiaye | H04L 63/045 713/168 |
| 2008/0168536 A1* | 7/2008 | Rueckwald | H04L 51/12 726/4 |
| 2008/0274716 A1 | 11/2008 | Fok et al. | |
| 2009/0222657 A1* | 9/2009 | Bender | H04W 12/062 713/156 |
| 2010/0230489 A1 | 9/2010 | Sugiyama | |
| 2013/0023257 A1* | 1/2013 | Murakami | H04W 8/20 455/418 |
| 2015/0006689 A1 | 1/2015 | Szilagyi et al. | |
| 2017/0177477 A1* | 6/2017 | Sutera | G06F 12/0607 |
| 2017/0180134 A1 | 6/2017 | King | |
| 2017/0279618 A1* | 9/2017 | Kent | H04L 9/006 |
| 2017/0346639 A1 | 11/2017 | Muftic | |
| 2018/0183587 A1 | 6/2018 | Won et al. | |
| 2018/0267539 A1 | 9/2018 | Shih | |
| 2019/0034459 A1 | 1/2019 | Qiu | |
| 2019/0036711 A1* | 1/2019 | Qiu | H04L 9/3268 |
| 2019/0036712 A1 | 1/2019 | Qiu | |
| 2019/0104196 A1 | 4/2019 | Li et al. | |
| 2019/0205773 A1 | 7/2019 | Ackerman et al. | |
| 2019/0251555 A1* | 8/2019 | McCormick | G06F 16/2379 |
| 2019/0317924 A1 | 10/2019 | Alimi et al. | |
| 2019/0347656 A1 | 11/2019 | Lu et al. | |
| 2019/0363896 A1 | 11/2019 | Finlow-Bates | |
| 2019/0373137 A1* | 12/2019 | Krukar | G06F 3/1222 |
| 2019/0386969 A1* | 12/2019 | Verzun | H04L 63/102 |
| 2019/0392164 A1 | 12/2019 | Dutta et al. | |
| 2020/0034353 A1 | 1/2020 | Innocenti | |
| 2020/0004846 A1 | 5/2020 | Camenisch et al. | |
| 2020/0145234 A1 | 5/2020 | Nishijima | |
| 2020/0250177 A1* | 8/2020 | Padmanabhan | G06F 16/214 |
| 2020/0259646 A1 | 8/2020 | Kwak | |
| 2020/0312005 A1 | 10/2020 | Desai et al. | |
| 2020/0320417 A1* | 10/2020 | Corning | H04L 63/10 |
| 2020/0372594 A1 | 11/2020 | Li | |
| 2020/0387533 A1 | 12/2020 | Nolte et al. | |
| 2020/0387893 A1 | 12/2020 | Maim | |
| 2021/0012278 A1* | 1/2021 | Alon | G06Q 10/0832 |
| 2021/0119768 A1* | 4/2021 | Han | H04L 9/0637 |
| 2021/0135867 A1* | 5/2021 | Zeng | H04L 63/12 |
| 2021/0160314 A1* | 5/2021 | Parvataneni | H04L 9/3239 |
| 2021/0271681 A1 | 9/2021 | Jayaram et al. | |
| 2021/0280306 A1 | 9/2021 | Fairless et al. | |
| 2021/0328814 A1 | 10/2021 | Wei et al. | |
| 2021/0328816 A1 | 10/2021 | Wei et al. | |
| 2021/0337023 A1 | 10/2021 | Yang | |
| 2022/0045868 A1 | 2/2022 | Falk et al. | |

FOREIGN PATENT DOCUMENTS

| | | |
|---|---|---|
| CN | 107360001 | 11/2017 |
| CN | 107426157 | 12/2017 |
| CN | 108667618 | 10/2018 |
| CN | 108737106 | 11/2018 |
| CN | 108765058 | 11/2018 |
| CN | 109067543 | 12/2018 |
| CN | 109242467 | 1/2019 |
| CN | 109299333 | 2/2019 |
| CN | 109327528 | 2/2019 |
| CN | 109743328 | 5/2019 |
| CN | 110035059 | 7/2019 |
| CN | 110213058 | 9/2019 |
| CN | 110535628 | 12/2019 |
| CN | 110611647 | 12/2019 |
| CN | 110874747 | 3/2020 |
| CN | 110958118 | 4/2020 |
| CN | 111092724 | 5/2020 |
| CN | 111383021 | 7/2020 |
| EP | 3813321 A1 | 4/2021 |
| JP | 2018173692 | 11/2018 |
| KR | 102002509 | 7/2019 |
| WO | 2020088110 A1 | 5/2020 |

OTHER PUBLICATIONS

Nakamoto, "Bitcoin: A Peer-to-Peer Electronic Cash System," www.bitcoin.org, 2005, 9 pages.
Extended European Search Report in European Appln. No. 21178838.5, dated Dec. 3, 2021, 8 pages.
Extended European Search Report in European Appln. No. 21179784.0, dated Dec. 2, 2021, 8 pages.
Extended European Search Report in European Appln. No. 21179811.1, dated Dec. 2, 2021, 8 pages.

* cited by examiner

BLOCKCHAIN INTEGRATED STATIONS AND AUTOMATIC NODE ADDING METHODS AND APPARATUSES

CROSS-REFERENCE TO RELATED APPLICATIONS

This application claims priority to Chinese Patent Application No. 202010652952.7, filed on Jul. 8, 2020, which is hereby incorporated by reference in its entirety.

TECHNICAL FIELD

The present disclosure relates to the field of terminal technologies, and in particular to blockchain integrated stations and automatic node adding methods and apparatuses thereof.

BACKGROUND

Blockchain technology (also called distributed ledger technology) is a decentralized distributed database technology having many characteristics of decentralization, openness, transparency, immutability and trustability and the like, and thus it is applicable to many application scenarios with high demands for data reliability.

SUMMARY

In view of this, one or more embodiments of the present disclosure provide blockchain integrated stations and automatic node adding methods and apparatuses thereof.

To achieve the above-mentioned object, one or more embodiments of the present disclosure provide the following technical solution:

According to a first aspect of one or more embodiments of the present disclosure, provided is an automatic node adding method of a blockchain integrated station, including:

receiving, by the blockchain integrated station, a configuration instruction after accessing a blockchain network, and configuring a first network address corresponding to a certificate authority center and a second network address corresponding to a first blockchain node in the blockchain network respectively according to the configuration instruction;

initiating, by the blockchain integrated station, an authentication request to the certificate authority center according to the first network address, and receiving a digital certificate returned by the certificate authority center after the certificate authority center determines the authentication request passes verification;

sending, by the blockchain integrated station, the digital certificate to the first blockchain node according to the second network address, wherein the digital certificate is used to trigger the first blockchain node to add the blockchain integrated station as a newly-added blockchain node in the blockchain network.

According to a second aspect of one or more embodiments of the present disclosure, provided is an automatic node adding apparatus of a blockchain integrated station, including:

an address configuring unit, configured to enable the blockchain integrated station to receive a configuration instruction after accessing a blockchain network, and configure a first network address corresponding to a certificate authority center and a second network address corresponding to a first blockchain node in the blockchain network respectively according to the configuration instruction;

a certificate requesting unit, configured to enable the blockchain integrated station to initiate an authentication request to the certificate authority center according to the first network address, and receive a digital certificate returned by the certificate authority center after the certificate authority center determines the authentication request passes verification;

a certificate sending unit, configured to enable the blockchain integrated station to send the digital certificate to the first blockchain node according to the second network address, wherein the digital certificate is used to trigger the first blockchain node to add the blockchain integrated station as a newly-added blockchain node in the blockchain network.

According to a third aspect of one or more embodiments of the present disclosure, provided is a blockchain integrated station, including:

a processor;

a memory storing instructions executable by the processor;

wherein the processor implements the method according to the first aspect by running the executable instructions.

According to a fourth aspect of one or more embodiments of the present disclosure, provided is a computer readable storage medium for storing computer instructions, wherein the instructions are executed by a processor to implement steps of the method according to the first aspect.

DETAILED DESCRIPTION OF THE EMBODIMENTS

Figure 1:
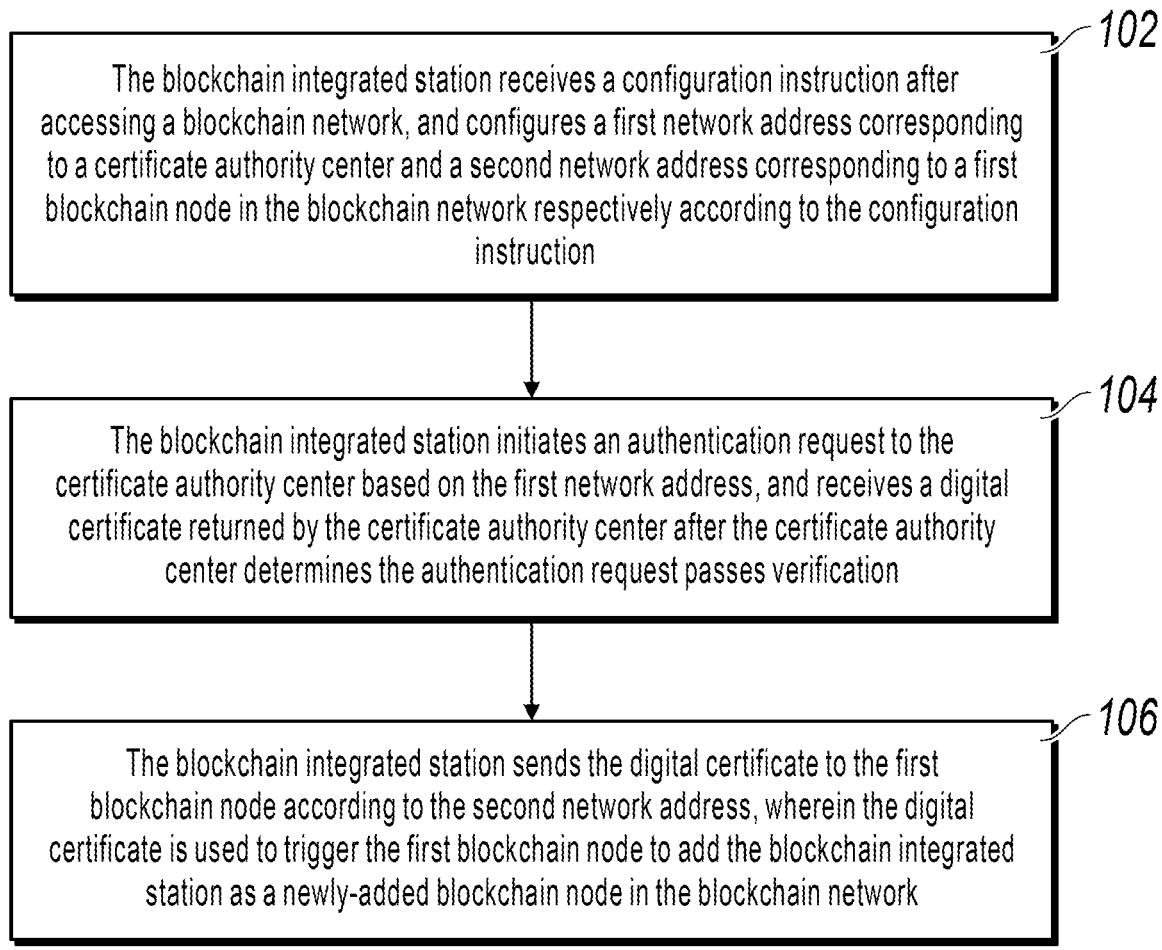
FIG. 1 is a flowchart of an automatic node adding method of a blockchain integrated station according to example embodiments of the present disclosure.

Example embodiments will be described in detail herein with the example embodiments thereof expressed in the drawings. When the following descriptions involve the drawings, same numbers in different drawings represent same or similar elements unless stated otherwise. The implementations described in the following example embodiments do not represent all implementations consistent with one or more embodiments of the present disclosure. On the contrary, they are merely embodiments of apparatuses and methods consistent with some aspects of one or more embodiments of the present disclosure described in detail in the appended claims.

It should be noted that the steps of corresponding method is not necessarily performed according to the sequence shown in the present disclosure in other embodiments. In some other embodiments, the steps included in the corresponding method can be more or less than described in the present disclosure. Further, a single step described in the present disclosure can be divided into several steps for descriptions in other embodiments while several steps described in the present disclosure can be combined into a single step for descriptions in other embodiments.

In the early stage of development of the blockchain technology, users mostly add their own personal computer (PC) and laptop computer and the like into a blockchain network to become a blockchain node in the blockchain network. At this time, the stage can be called 1.0 architecture era of blockchain network, in which the behaviors of users to participate in the blockchain network are autonomous and the users also need to perform autonomous maintenance, for example, perform maintenance and configuration and so on for their devices (for example, PC) participating in the blockchain network. Along with continuous development of the blockchain technology, especially along with increasing needs of users for infrastructures with high performance and high availability, the blockchain network develops into 2.0 architecture era based on cloud service. In the 2.0 architecture era, Blockchain-as-a-Service (BaaS) provides fast and convenient solutions for fast blockchain deployment and technical implementation and supports a large number of blockchain service projects. Generally, BaaS is built on infrastructures such as public cloud or private cloud, which introduces heavy dependence on infrastructure as well as providing strong deployment capability. However, because blockchain is a typical distributed computing technology, not all nodes can be migrated to clouds but privatization deployment is needed. The additional technical migration and maintenance costs brought by the privatization deployment cause inconsistent technical interfaces and high deployment and maintenance costs during an actual implementation. Therefore, to satisfy the needs of users for privatization and security and the like of the blockchain network, architecture needs to be further upgraded to the blockchain network, thereby realizing 3.0 architecture era based on blockchain integrated station.

Software and hardware integration can be realized for the blockchain integrated station. When providing a blockchain integrated station, a provider will not only provide hardware devices of the blockchain integrated station to users but also provide software configurations for realizing deep optimizations of the hardware devices integrated into the blockchain integrated station, thereby realizing the above-mentioned software-hardware integration.

Hardware optimization can be realized for the blockchain integrated station. For example, a dedicated smart contract processing chip can be deployed on the blockchain integrated station. For example embodiments, the smart contract processing chip can be Field Programmable Gate Array (FPGA) chip, or another type of chip to increase the processing efficiency for a smart contract. A hardware root-of-trust key can be deployed on the smart contract processing chip, for example, the hardware root-of-trust key can be pre-programmed by the provider into the smart contract processing chip and the provider can also know a public key corresponding to the hardware root-of-trust key (for example, the key is disclosed). Therefore, the smart contract processing chip can send negotiation information to the provider and sign the negotiation information by using the hardware root-of-trust key, so that the provider can verify the signature based on the corresponding public key; and, after successful signature verification, it is ensured that the smart contract processing chip and the provider obtain the same key through negotiation based on the above-mentioned negotiation information. The negotiated key can include a file deployment key, and thus the provider can encrypt and transmit a binary image file needed by the blockchain node to the smart contract processing chip based on the file deployment key, and the smart contract processing chip can decrypt and deploy the binary image file based on the file deployment key. The negotiated key can include a service secret deployment key, and thus the provider can encrypt and transmit a node private key of the blockchain node, a service root key of the blockchain node etc., to the smart contract processing chip based on the service secret deployment key, and the smart contract processing chip can obtain and deploy the node private key and the service root key and the like based on the service secret deployment key to satisfy the privacy transaction needs in a blockchain scenario. For example, the node private key corresponds to a node public key, and thus a client device can perform encrypted transmission for a blockchain transaction by using the node public key, and the blockchain node can perform decryption by using the node private key. The service root key is a symmetric key which can be used to perform encrypted storage for service data such as contract codes and values of contract status and the like. The service root key may not be directly used, and the smart contract processing chip can perform encryption and decryption by using a derivation key of the service root key to reduce the security risk of the service root key. Through reliable management for the node private key and the service root key (or its derivation key), data will be always in encrypted state unless processed by the smart contract processing chip. Therefore, the smart contract processing chip actually forms a Trusted Execution Environment (TEE) of hardware on the blockchain integrated station, so as to ensure the data requiring privacy protection such as transactions, contract codes, and contract statuses will not be leaked.

For another example, an intelligent network card can be deployed on the blockchain integrated station. In addition to realizing a traditional network card function, the intelligent network card also can replace or assist a CPU of the blockchain integrated station to perform partial functions so as to offload computation of the CPU. Especially, the operations with intensive network I/O can be transferred from CPU to the intelligent network card to perform, so that the CPU can process more computation-intensive operations, for example embodiments, transaction processing, and storage processing and the like. Compared with other components (for example, CPU) on the blockchain integrated station, the intelligent network card is closer to the network regardless of physical level or logical level, so the intelligent network card can always fetch data transmitted in the network preferentially. Therefore, with no storage access or a small amount of storage access is involved, the intelligent network card can process these data with a relatively higher processing efficiency and a relatively smaller delay, and a relatively larger throughput, so as to achieve a higher performance benefit with a lower cost. For example embodiments, in consensus algorithm, there is almost no need to access storage except in the cases of change of network status, addition and deletion of node, change of consensus configuration and the like. Therefore, the consensus operation can be completed by the intelligent network card and only need to inform the CPU of a consensus result. Therefore, the CPU is not needed to directly participate in the consensus process, thereby significantly improving the consensus efficiency. Similarly, the same effect can be achieved in forwarding transactions by the intelligent network card and achieving block synchronization by the intelligent network card on a newly-added blockchain node and the like and will not be repeated herein. Furthermore, after receiving transactions, the intelligent network card can identify or filter out a replay transaction by comparing with the received transaction with historical transactions, for example, compare data fields of sender information of transaction, destination address, time stamp, and hash value and the like. The intelligent network card can also perform content analysis for those received transactions, so as to filter out illegal transactions or predefined undesired transactions and the like as a supplementation to layer-2 or layer-3 packet filtering implemented by a switch.

For another example, a cryptographic acceleration card which is also called a high speed cryptographic card can be deployed on the blockchain integrated station. The cryptographic acceleration card can realize total encrypted memory, defend against side-channel attacks by hardware reinforcement, and also realize physical protection against approaches such as probe, laser and the like, having very high security. For example, the cryptographic acceleration card used on the blockchain integrated station can have level-2 qualification from the State Cryptography Administration, level-3 qualification from the State Cryptography Administration and the like. When the cryptographic acceleration card is deployed, the hardware roof-of-trust key as described above can be maintained in the cryptographic acceleration card, and the cryptographic acceleration card can perform signature operation based on the hardware roof-of-trust key and replace or assist the smart contract processing chip to complete the operations such as the key negotiation as described above. Similarly, the cryptographic acceleration card can be used to maintain a public key so that the cryptographic acceleration card can realize signature verification operation based on the maintained public key. In short, at least part of operations relating to key management, encryption and decryption, and signature verification and the like on the blockchain integrated station can be handed over to the cryptographic acceleration card, so that very high security can be realized and task offloading can be realized for the CPU of the blockchain integrated station or the above-mentioned smart contract processing chip, thereby improving the processing efficiency.

Software optimization can be realized for the blockchain integrated station. For example, a certificate authority service can be built in the blockchain integrated station to realize automatic certificate issuing, node identity authentication, automatic blockchain construction, and automatic adding of blockchain node, thereby realizing the plug and play of the blockchain integrated station. In this case, a user can realize fast deployment of the blockchain integrated station. In addition to quickly establishing a private blockchain network among a plurality of blockchain integrated stations, the blockchain integrated station can integrate a standardized on-cloud service interface to enable the blockchain integrated station to automatically connect to on-cloud service, thereby realizing hybrid deployment between the blockchain integrated station and the cloud-deployed blockchain node and to construct a hybrid blockchain network. The blockchain integrated station can also integrate a standardized cross-chain service interface to enable the blockchain integrated station to realize cross-chain services based on a standardized cross-chain protocol or standardized cross-chain service, thereby greatly expanding the application scenarios of the blockchain integrated station, and satisfying the cross-chain needs of users. For example, cross-chain data interaction between different blockchain networks is achieved, and for another example, cross-chain data interaction between the blockchain network and an off-chain computing node and the like is achieved (for example, the off-chain computing node shares computation task for the blockchain node and the like).

Based on a unified software logic adopted on each blockchain integrated station, the blockchain integrated station in the present disclosure can realize automatic node adding after accessing a blockchain network, which will be described below in combination with the accompanying drawings.

FIG. 1 is a flowchart of an automatic node adding method of a blockchain integrated station according to example embodiments of the present disclosure. As shown in FIG. 1, the method can include the following steps.

At step 102, the blockchain integrated station receives a configuration instruction after accessing a blockchain network, and configures a first network address corresponding to a certificate authority center and a second network address corresponding to a first blockchain node in the blockchain network respectively according to the configuration instruction.

After accessing the blockchain network, the blockchain integrated station only realizes hardware-level network access. Logically, the blockchain integrated station has not become a blockchain node in the blockchain network. The blockchain integrated station needs to adopt the technical solution of the present disclosure to become a blockchain node in the blockchain network.

The configuration instruction received by the blockchain integrated station is used to configure the first network address and the second network address as described above. The configuration instruction can be input into the blockchain integrated station by a user using a peripheral device, that is, the values of the first network address and the second network address are actually configured by the user; or the first network address and the second network address are pre-configured in the blockchain integrated station upon leaving factory and in this case, the configuration instruction can be generated automatically by the blockchain integrated station after initial startup.

The first network address and the second network address can be IP addresses. The first network address and the second network address can be different. At this time, the certificate authority center and the first blockchain node are different entities. The certificate authority center can be an independent device different form a blockchain node in the blockchain network so as to be specially used to issue a certificate, or the certificate authority center can be deployed at another blockchain node different from the first blockchain node in the blockchain network.

In some cases, the first network address and the second network address can be identical. At this time, the certificate authority center and the first blockchain node are the same one entity, for example, assuming that the first blockchain node initiates a certificate authority (CA) service. Because the first network address and the second network address are identical, it is equivalent to configuring only one network address. The first blockchain node can be formed by the blockchain integrated stations, or the first blockchain node can be another type of node device, which is not limited herein.

Actually, each blockchain node in the blockchain network can be in-built with a CA service. But, in general, only some of the blockchain nodes in the network will initiate the CA service, and typically, only one blockchain node initiates the CA service and other blockchain nodes need to apply for a certificate to the blockchain integrated station. Of course, there can be differences between different blockchain nodes, for example, the CA service is built in only some of the blockchain nodes in the network. In this case, one or more of these blockchain nodes can initiate the CA service and assist in issuing a certificate to other blockchain nodes without built-in CA service.

At step 104, the blockchain integrated station initiates an authentication request to the certificate authority center based on the first network address, and receives a digital certificate returned by the certificate authority center after the certificate authority center determines the authentication request passes verification.

The blockchain network can be a dedicated network. The blockchain integrated station accesses the dedicated network via a tunnel to perform operations such as applying for digital certificate and participating in blockchain network and the like. Because the blockchain integrated station is needed to provide corresponding network information and login authentication information and the like when establishing the tunnel, a corresponding rule is set for accessing the blockchain integrated station, which is equivalent to realizing permission control for accessing the blockchain integrated station, thereby avoiding unauthorized access into the blockchain network. The certificate authority center can be deployed in the blockchain network or in a public network outside the blockchain network, as long as the blockchain integrated station can smoothly access. If the certificate authority center is deployed in the blockchain network, the certificate authority center can be a blockchain node already initiated a CA service in the blockchain network as above-mentioned. Of course, the certificate authority center can also be an independent device. If the certificate authority center is deployed in a public network outside the blockchain network, the certificate authority center can be deployed on the BaaS platform in the public network.

Based on different network environments where the certificate authority center is located, the processes in which the blockchain integrated station initiates an authentication request according to the first network address may be different to some extent, but the authentication request will be eventually sent to the certificate authority center. When issuing a digital certificate, the certificate authority center needs to use its own CA identity key, where the CA identity key includes a CA identity private key and a CA identity public key. Similarly, the blockchain integrated station also has an identity key of a dedicated node device which includes a private key of a dedicated node device and a public key of a dedicated node device. The private key of the dedicated node device is maintained by the blockchain integrated station, and the public key of the dedicated node device is included in the above-mentioned authentication request. Further, the authentication request includes other description information of the blockchain integrated station. These description information are used for the certificate authority center to determine the identity of the blockchain integrated station. After determining the authentication request passes verification, the certificate authority center signs the public key of the dedicated node device, the description information of the dedicated node device, and information of the certificate authority center by using the above-mentioned CA private key, so as to generate the digital certificate of the blockchain integrated station.

At step 106, the blockchain integrated station sends the digital certificate to the first blockchain node according to the second network address, wherein the digital certificate is used to trigger the first blockchain node to add the blockchain integrated station as a newly-added blockchain node in the blockchain network.

The digital certificate issued by the certificate authority center is used to indicate that the blockchain integrated station corresponding to the digital certificate already passes the identity authentication of the certificate authority center. Therefore, by performing verification for the digital certificate provided by the blockchain integrated station, the first blockchain node can add the blockchain integrated station as a newly-added blockchain node in the blockchain network after successful verification.

When performing verification for the digital certificate of the blockchain integrated station, the first blockchain node needs to use a root certificate. The root certificate is a digital certificate issued by the certificate authority center for itself. The certificate authority center generates the above-mentioned root certificate by signing the CA public key and description information of the certificate authority center by using the above-mentioned CA private key. Because the certificate authority center generates the digital certificate by signing its own public key with its own private key, the digital certificate corresponding to the certificate authority center is a root certificate which is also called a self-signed certificate. The first blockchain node can obtain the CA public key included in the root certificate and perform signature verification for the digital certificate sent by the blockchain integrated station by using the CA public key after receiving the digital certificate. In this way, in a case of successful verification, the first blockchain node determines the digital certificate is issued by the certificate authority center and accepts the corresponding blockchain integrated station as a blockchain node in the blockchain network.

After being determined as passing verification by any blockchain node in the blockchain network, the digital certificate is used to indicate the any blockchain node to initiate a transaction for adding node in the blockchain network. The transaction is executed after all blockchain nodes in the blockchain network pass a consensus, so that the blockchain integrated station corresponding to the digital certificate is added as a newly-added blockchain node in the blockchain network.

Take the first blockchain node as an example, the first blockchain node verifies the digital certificate sent by the blockchain integrated station by using the CA public key included in the root certificate, and creates a transaction for adding node after successful verification. For example, the type of the transaction is a node adding type (for example, the type can be determined according to the value of Type field of transaction), and the Data field of the transaction includes information of the above-mentioned blockchain integrated station. The transaction is sent by the first blockchain node to all blockchain nodes in the blockchain network and a consensus is performed among all blockchain nodes: if the above-mentioned transaction passes the consensus, it indicates that all blockchain nodes in the blockchain network accept the above-mentioned blockchain integrated station. In this case, the above-mentioned transaction is recorded into a blockchain, and the blockchain integrated station is added as a newly-added blockchain node in the blockchain network. Further, each blockchain node in the blockchain network can maintain one node information list which is used to record information of a blockchain node accepted by the each blockchain node, for example, the information can include IP address and public key and the like. Thus, after the above-mentioned blockchain integrated station is accepted, the information of the blockchain integrated station is recorded by each blockchain node in the blockchain network into the node information list maintained by each blockchain node. Similarly, after the blockchain integrated station becomes a newly-added blockchain node, the blockchain integrated station can synchronize the node information list in addition to synchronizing blockchain data and status data and the like with the existing blockchain nodes.

After the blockchain integrated station accesses the blockchain network, a blockchain node in the blockchain network can automatically discover the blockchain integrated station. For example, when a second blockchain node discovers the blockchain integrated station, the second blockchain node can proactively send inquiry information to the blockchain integrated station. Correspondingly, the blockchain integrated station can send the above-mentioned digital certificate to the second blockchain node in response to receiving the inquiry information, where the digital certificate is used to trigger the second blockchain node to add the blockchain integrated station as a newly-added blockchain node in the blockchain network. The process in which the second blockchain node adds the blockchain integrated station as a newly-added blockchain node is similar to that of the first blockchain node, that is, a transaction for adding node is initiated after it is determined the digital certificate passes verification, so that the blockchain integrated station is added as a newly-added blockchain node after the transaction passes consensus, which will not be repeated herein. Although the blockchain integrated station can proactively send the digital certificate to the first blockchain node for identity verification according to a configured second network address, the first blockchain node may not work normally due to some reason and thus cannot smoothly add the blockchain integrated station as a newly-added blockchain node. In this case, with the automatic discovery function of the second blockchain node for the blockchain integrated station, it can be ensured that the blockchain integrated station can be smoothly added to the blockchain network without configuring a new second network address in a case of abnormality of the first blockchain node, thus avoiding failure of adding the blockchain integrated station. In this way, a time needed for adding the blockchain integrated station can be shortened.

Figure 2:
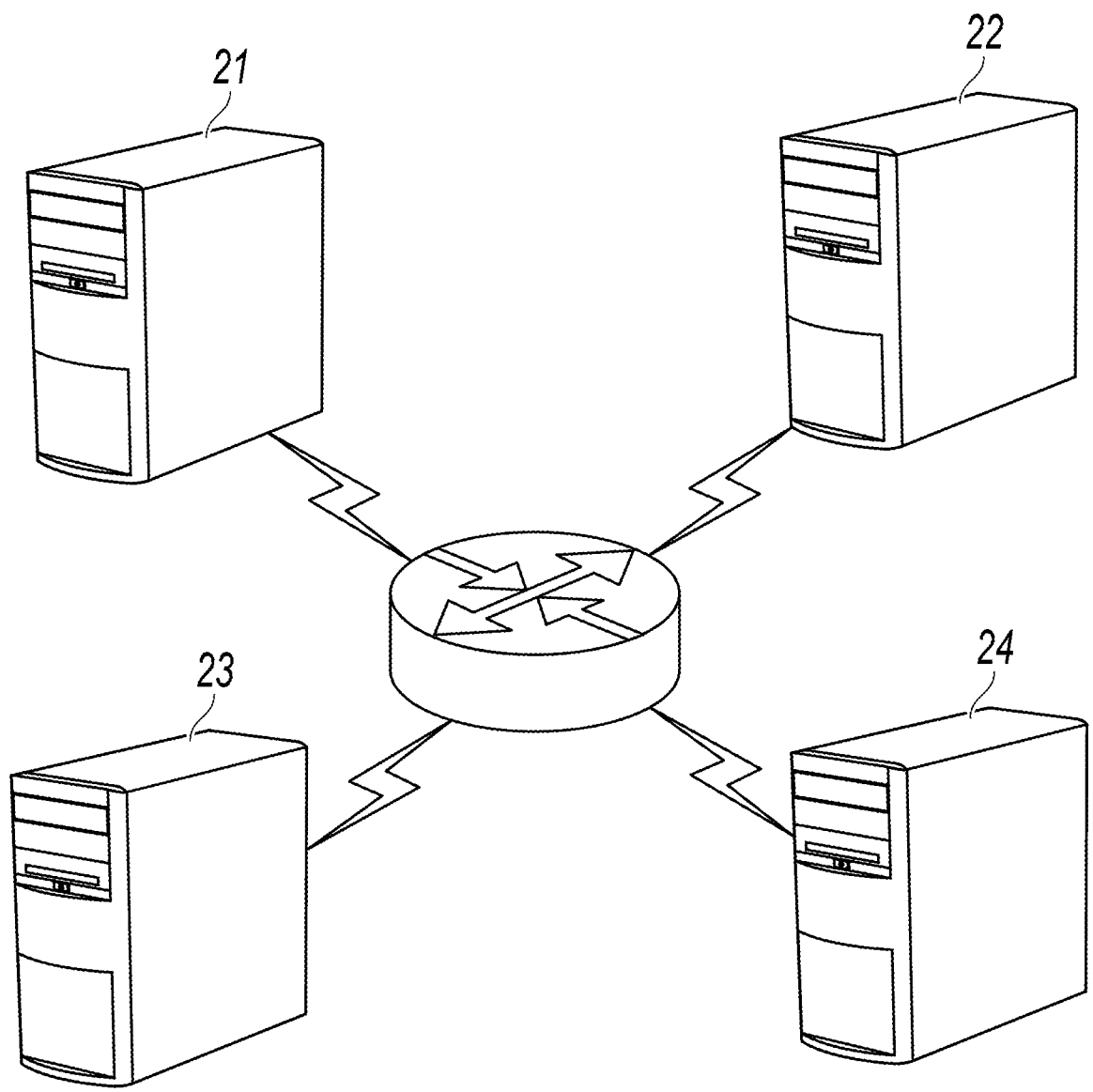
FIG. 2 is a schematic diagram of a scenario in which a blockchain integrated station realizes automatic node adding to a blockchain network according to example embodiments of the present disclosure.

FIG. 2 shows an example scenario where a blockchain integrated station realizes automatic node adding in a blockchain network. FIG. 2 involves four blockchain integrated stations, i.e. a blockchain integrated station 21, a blockchain integrated station 22, a blockchain integrated station 23, and a blockchain integrated station 24. Of course, the quantity of the blockchain integrated stations is not limited herein. Assuming that the blockchain integrated stations 22-24 already become blockchain nodes in the blockchain network, the blockchain integrated station 21 can desire to participate in the blockchain network as a newly-added node and become a new node of the blockchain network through the interaction process of FIG. 3.

At step 301, the blockchain integrated station 21 configures an IP address.

The blockchain integrated station 21 configures an IP address of the CA center and an IP address of the original blockchain node respectively according to a received IP address configuration instruction. For example, the IP address of the CA center actually is an IP address of the blockchain integrated station 22, and the IP address of the original blockchain node actually is an IP address of the blockchain integrated station 23.

Herein, the blockchain integrated station 22, on the one hand, is configured as a blockchain node and on the other hand, initiates the CA service, such that the blockchain integrated station 22 is also configured as the above-mentioned CA center. Of course, in other embodiments, the blockchain node and the CA center are not necessarily configured in a same device, which is not limited herein. The IP address of the original blockchain node can also be an IP address of any blockchain node, for example, the blockchain integrated station 22 and the blockchain integrated station 24 and the like in the blockchain network in addition to the IP address of the blockchain integrated station 23.

At step 302, the blockchain integrated station 21 generates and sends an authentication request to the blockchain integrated station 22.

The blockchain integrated station 21 generates an identity key of a dedicated node device which can include a private key of a dedicated node device and a public key of a dedicated node device. The authentication request generated by the blockchain integrated station 21 can include the public key of the dedicated node device and description information of the blockchain integrated station 21. The description information of blockchain integrated station can include ID information, product serial number, IP address, MAC address and the like. Thus, the description information is not limited herein as long as it can prove the identity of the blockchain integrated station.

At step 303, the blockchain integrated station 22 performs identity verification and generates and returns a digital certificate to the blockchain integrated station 21.

After receiving the authentication request from the blockchain integrated station 21, the blockchain integrated station 22 verifies the description information of the blockchain integrated station 21 included in the authentication request through the CA service and then generates the digital certificate for the blockchain integrated station 21 after successful verification. Specifically, there is a CA identity key in the blockchain integrated station 22, and the CA identity key includes a CA private key and a CA public key. The CA service can sign the public key of the dedicated node device and the description information of the blockchain integrated station 22, and the description information of the blockchain integrated station 21 as described above by using the CA private key to generate a digital certificate corresponding to the blockchain integrated station 21. Herein, the description information of the blockchain integrated station 21 adopted for signature may be inconsistent with the description information of the blockchain integrated station 22, for example, they can include different types of description information, which depends on a rule set by the CA service. Similarly, the description information of the blockchain integrated station 21 included in the authentication request can be inconsistent with the description information of the blockchain integrated station 21 adopted for signature, for example, the description information adopted for signature can be only part of the description information included in the authentication request, and especially can exclude part of description information that is not suitable for disclosure (for example, relating to privacy), for another example, the description information adopted for signature can be a hash value of the description formation included in the authentication request. Thus, the digital certificate can fully correspond to the description information included in the authentication request, and be prevented from disclosing the description information unsuitable for disclosure.

At step 304, the blockchain integrated station 21 sends the digital certificate to the blockchain integrated station 23 for verification.

At step 305, the blockchain integrated station 23 verifies the digital certificate.

When verifying the digital certificate, the blockchain integrated station 23 needs to use a root certificate generated by the blockchain integrated station 22. The blockchain integrated station 22 generates the root certificate by the CA service. Specifically, the CA service can sign the CA public key and the description information of the blockchain integrated station 22 though the above-mentioned CA private key to generate a digital certificate corresponding to the blockchain integrated station 22, i.e. the above-mentioned root certificate. When performing verification for the digital certificate, the blockchain integrated station 23 needs to obtain the CA public key from the root certificate and perform signature verification for the digital certificate sent by the blockchain integrated station 21 by using the CA public key. If the signature verification is successful, it indicates that the digital certificate is indeed issued by the CA service on the blockchain integrated station 22. Thus, the blockchain integrated station 23 can preliminarily determine the blockchain integrated station 21 as a blockchain node based on the endorsement of the CA service for the blockchain integrated station 21.

At step 306, the blockchain integrated station 23 submits a transaction for adding node in the blockchain network after successful verification, and performs transaction consensus with other blockchain nodes.

At step 307, after the transaction passes the consensus, the blockchain integrated station 23 adds the blockchain integrated station 21 as a newly-added node.

After the blockchain integrated station 23 preliminarily determines the blockchain integrated station 21 as a blockchain node, other blockchain nodes in the blockchain network also need to accept the blockchain integrated station 21. Only in this way can the blockchain integrated station 21 be really added as a newly-added node. Therefore, the blockchain integrated station 23 can submit a transaction for adding node. The value of the Type field of the transaction can indicate it is a transaction of a node adding type, and the Data field of the transaction can include information of the blockchain integrated station 21, for example embodiments, the IP address, the public key of the dedicated node device and the digital certificate and the like of the blockchain integrated station 21. After the above-mentioned transaction is submitted, all blockchain nodes in the blockchain network will receive the transaction and further perform consensus for the transaction. If a particular blockchain node accepts the blockchain integrated station 21 and agrees to add the blockchain integrated station 21 as a newly-added node, the blockchain node can agree to record the above-mentioned transaction in the blockchain. When all blockchain nodes agree to record the transaction in the blockchain, it indicates that the above-mentioned transaction passes consensus. At this time, the blockchain integrated station 21 is added as a newly-added node in the blockchain network.

Each blockchain node in the blockchain network can maintain one node information list to record node information of all blockchain nodes accepted by each blockchain node, such as IP address, public key, and digital certificate of node. In the above-mentioned embodiments, the blockchain integrated stations 22-24 respectively maintain node information lists, and respectively add the information of the blockchain integrated station 21 to node information lists after the above-mentioned transaction passes consensus, which indicates the blockchain integrated station 21 is determined as a newly-added node. Only after the blockchain integrated station 21 becomes the newly-added node can the blockchain integrated stations 22-24 allow data synchronization with the blockchain integrated station 21, where the data synchronization includes blockchain data synchronization, and status data synchronization. Alternatively, the status data does not have to be synchronized because the blockchain integrated station 21 can calculate the status data after obtaining the blockchain data. Further, the blockchain integrated station 21 can also synchronize the node information lists maintained by the blockchain integrated stations 22-24 so that the node information list maintained by the blockchain integrated station 21 is obtained.

Figure 3:
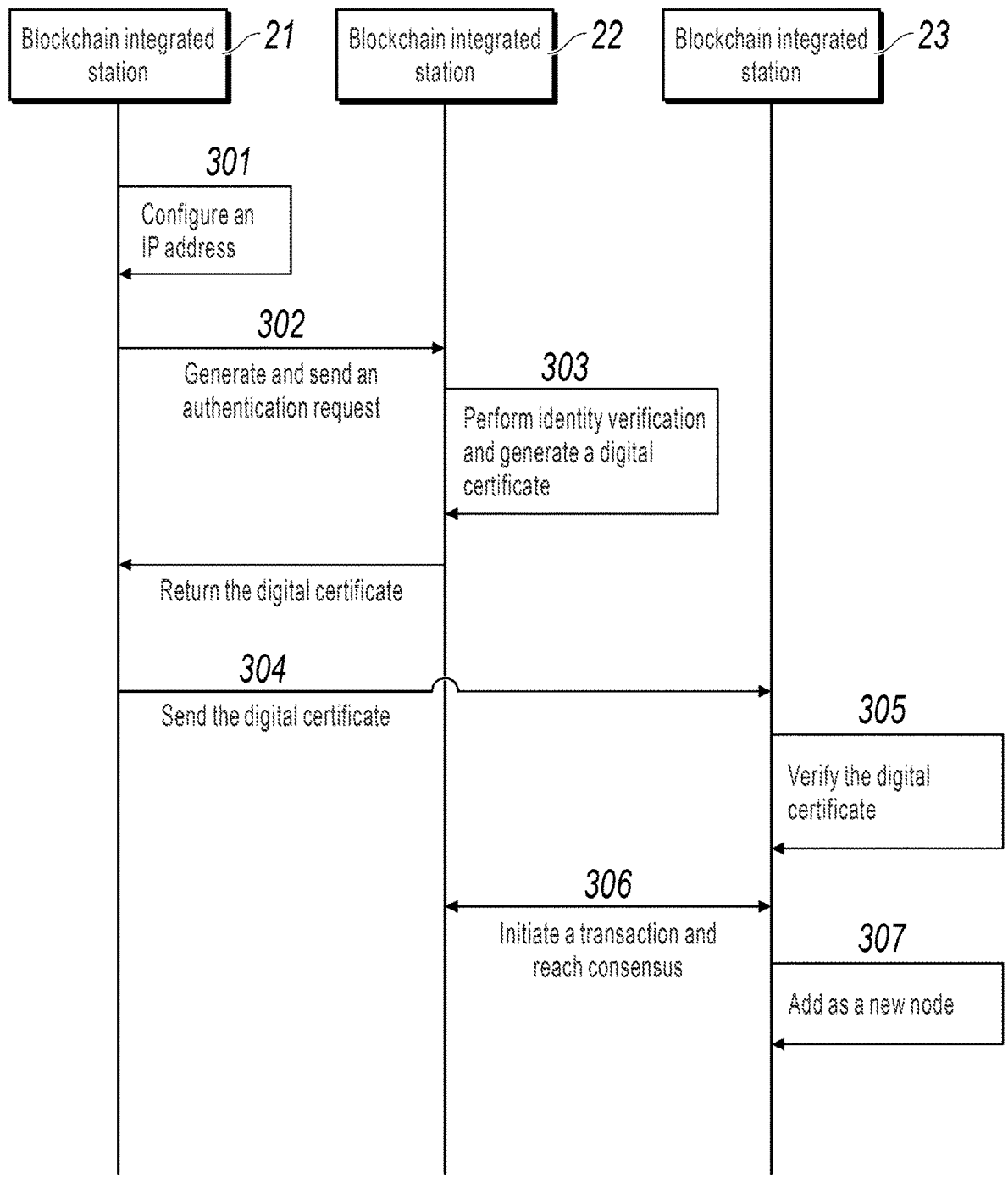
FIG. 3 is an interaction flowchart in which a blockchain integrated station realizes automatic node adding according to example embodiments of the present disclosure.

Thus, the blockchain integrated stations 21-24 can automatically complete digital certificate issuing and node authentication (based on verification of digital certificate) through the steps of FIG. 3 so that each blockchain integrated station determines and records the identified blockchain nodes respectively so as to automatically add the blockchain integrated station 21 as a newly-added node in the blockchain network.

Figure 4:
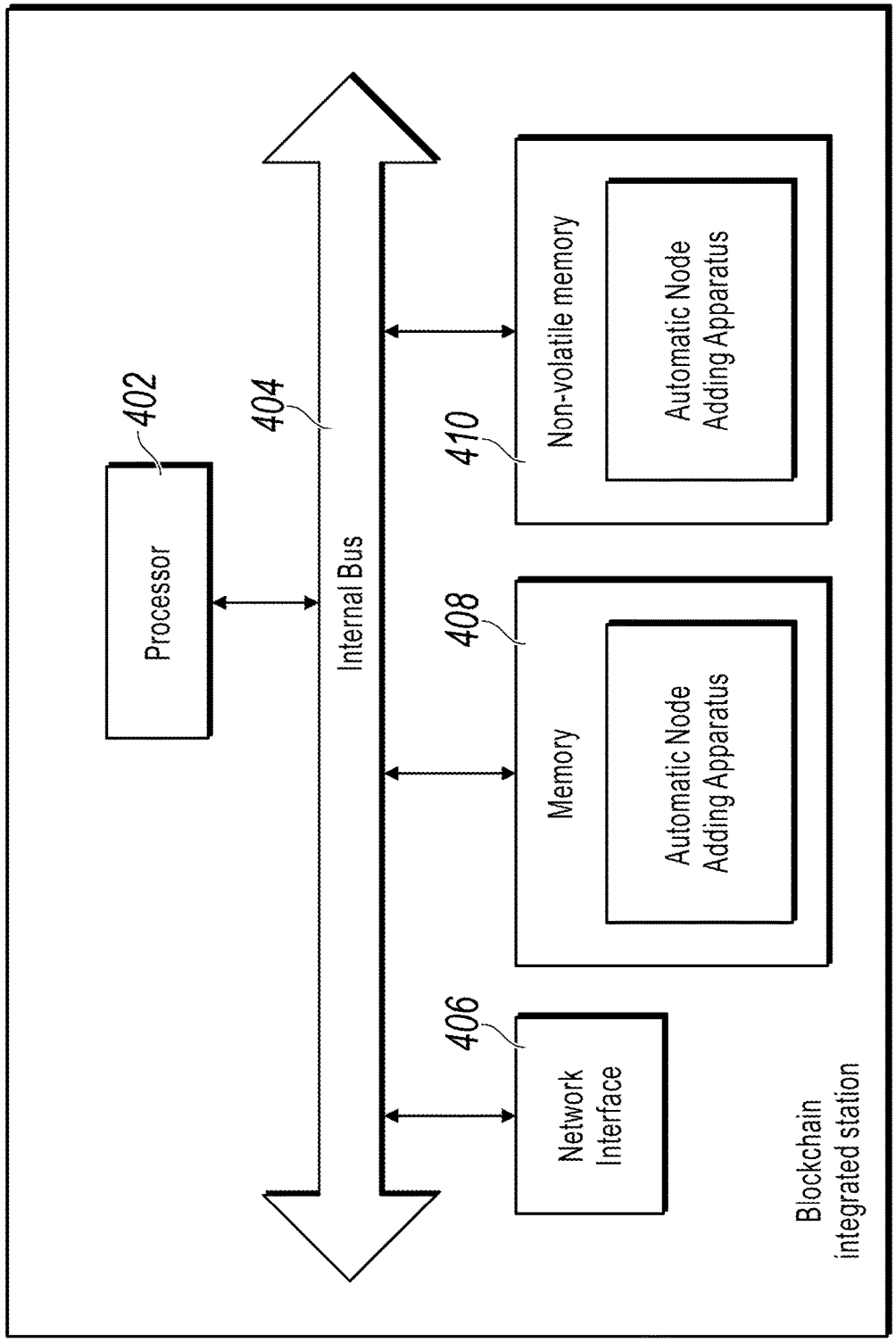
FIG. 4 is a structural schematic diagram of a blockchain integrated station according to example embodiments of the present disclosure.

FIG. 4 is a structural schematic diagram of a device according to example embodiments of the present disclosure. As shown in FIG. 4, from hardware level, the device includes a processor 402, an internal bus 404, a network interface 406, a memory 408 and a non-volatile memory 410. Of course, the device can further include hardware needed for other services. The processor 402 reads corresponding computer programs from the non-volatile memory 410 to the memory 408 and then runs the computer programs, so as to logically form an automatic node adding apparatus of a blockchain integrated station. Of course, in addition to the software implementation, one or more embodiments of the present disclosure do not preclude other implementations, for example, logic device or a combination of software and hardware or the like. That is, the executing subject of the following processing flow is not limited to each logic unit and can also be hardware or logic device.

Figure 5:
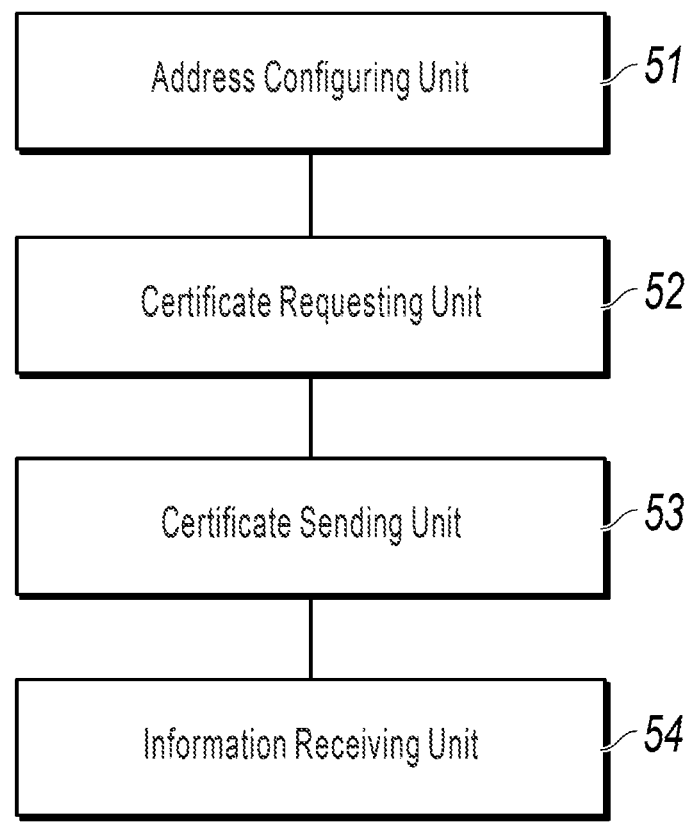
FIG. 5 is a block diagram of an automatic node adding apparatus of a blockchain integrated station according to example embodiments of the present disclosure.

As shown in FIG. 5, in a software implementation, the automatic node adding apparatus can include:

an address configuring unit 51, configured to enable a blockchain integrated station to receive a configuration instruction after accessing a blockchain network, and configure a first network address corresponding to a certificate authority center and a second network address corresponding to a first blockchain node in the blockchain network respectively according to the configuration instruction;

a certificate requesting unit 52, configured to enable the blockchain integrated station to initiate an authentication request to the certificate authority center according to the first network address, and receive a digital certificate returned by the certificate authority center after the certificate authority center determines the authentication request passes verification;

a certificate sending unit 53, configured to enable the blockchain integrated station to send the digital certificate to the first blockchain node according to the second network address, wherein the digital certificate is used to trigger the first blockchain node to add the blockchain integrated station as a newly-added blockchain node in the blockchain network.

Optionally, the blockchain network is a dedicated network which is accessed by the blockchain integrated station via a tunnel.

Optionally, the certificate authority center is deployed in the blockchain network, or the certificate authority center is deployed in a public network outside the blockchain network.

Optionally,

If the certificate authority center is deployed in the blockchain network, the certificate authority center is a blockchain node which has initiated a certificate authority service in the blockchain network.

If the certificate authority center is deployed in the public network outside the blockchain network, the certificate authority center is deployed on a Blockchain-as-a-Service (BaaS) platform in the public network.

Optionally, the apparatus further includes:

an information receiving unit 54, configured to enable the blockchain integrated station to receive inquiry information from a second blockchain node in the blockchain network, where the inquiry information is generated and sent by the second blockchain node after automatically discovering the blockchain integrated station.

The certificate sending unit 53 is further configured to enable the blockchain integrated station to send the digital certificate to the second blockchain node, where the digital certificate is used to trigger the second blockchain node to add the blockchain integrated station as a newly-added blockchain node in the blockchain network.

Optionally, after the digital certificate is determined as passing verification by any blockchain node in the blockchain network, the digital certificate is used to indicate the any blockchain node to initiate a transaction for adding a node in the blockchain network. The transaction is executed after all blockchain nodes in the blockchain network reach consensus, so that the blockchain integrated station is added as a newly-added blockchain node in the blockchain network.

Optionally, the blockchain integrated station is added as a newly-added blockchain node in the blockchain network, including: adding, by all blockchain nodes in the blockchain network, the information of the blockchain integrated station into node information lists maintained respectively by all blockchain nodes.

The systems, apparatuses, modules or units described in the above-mentioned embodiments can be specifically implemented by a computer chip or an entity or can be implemented by a product with a particular function. A typical implementing device can be a computer and the computer can specifically be a personal computer, a laptop computer, a cellular phone, a camera phone, a smart phone, a personal digital assistant, a media player, a navigation device, an email transceiver, a game console, a tablet computer, a wearable device, or a combination of any several devices of the above-mentioned devices.

In a typical configuration, the computer can include one or more central processing units (CPU), an input/output interface, a network interface and a memory.

The memory can include a non-permanent memory, a random access memory (RAM), and/or a non-volatile memory and the like in a computer readable medium, for example, read only memory (ROM), or flash RAM. The memory is one example of the computer readable medium.

The computer readable medium includes permanent, non-permanent, mobile and non-mobile media, which can realize information storage by any method or technology. The information can be computer readable instructions, data structures, program modules and other data. The examples of the computer storage medium include but not limited to: a phase change random access memory (PRAM), a Static Random Access Memory (SRAM), a Dynamic Random Access Memory (DRAM), and other types of RAMs, Read-Only Memory (ROM), an Electrically-Erasable Programmable Read-Only Memory (EEPROM), a Flash Memory, or other memory technology, CD-ROM, digital versatile disc (DVD) or other optical storage, cassette type magnetic tape, magnetic disk storage, quantum memory, storage medium based on graphene, or other magnetic storage device or other non-transmission medium for storing information accessible by computing devices. According to the definition of the present disclosure, the computer readable medium does not include transitory computer readable media, for example, modulated data signal and carriers.

It should be noted that the term "including", "containing" or any variation thereof is intended to encompass non-exclusive inclusion, so that a process, method, product or device including a series of elements includes not only those elements but also other elements not listed explicitly or those elements inherent to such a process, method, product or device. Without more limitations, an element defined by the statement "including a . . . " shall not be precluded to include additional same elements present in a process, method, product or device including the elements.

The specific embodiments are described as above. Other also are within the scope of the appended claims. In some cases, the actions or steps recorded in the claims can be performed in a sequence different from the examples to achieve the desired result. Further, the processes shown in drawings do not necessarily need a particular sequence or a continuous sequence shown to achieve the desired result. In some examples, a multi-task processing and parallel processing is possible and may also be advantageous.

The terms used in one or more embodiments of the present disclosure are for the purpose of describing particular examples only, and are not intended to limit the one or more embodiments of the present disclosure. Terms "a", "the" and "said" used in their singular forms in one or more embodiments of the present disclosure and the appended claims are also intended to include plurality, unless clearly indicated otherwise in the context. It should also be understood that the term "and/or" as used herein refers to and includes any and all possible combinations of one or more of the associated listed items.

It should be understood that, although the terms "first," "second," "third," and the like may be used in one or more embodiments of the present disclosure to describe various information, such information should not be limited to these terms. These terms are only used to distinguish one category of information from another. For example, without departing from the scope of one or more embodiments of the present disclosure, first information may be referred as second information; and similarly, the second information may also be referred as the first information. Depending on the context, the term "if" as used herein can be interpreted as "when" or "upon" or "in response to determining".

The above-mentioned disclosure is merely illustrative of preferred examples of one or more embodiments of the present disclosure but not intended to limit the present disclosure, and any modifications, equivalent substitutions, adaptations thereof made within the spirit and principles of the disclosure shall be encompassed in the scope of protection of the present disclosure.

What is claimed is:

1. A blockchain integrated station comprising:
   at least one processor; and
   one or more memories coupled to the at least one processor and storing programming instructions for execution by the at least one processor to perform one or more operations comprising:
- receiving, by the blockchain integrated station, a configuration instruction input by a user after accessing a blockchain network, wherein the blockchain integrated station has not become a blockchain node in the blockchain network;
- configuring, by the blockchain integrated station and based on the configuration instruction, a first network address corresponding to a certificate authority center and a second network address corresponding to a first blockchain node in the blockchain network;
- initiating, by the blockchain integrated station, an authentication request to the certificate authority center based on the first network address;
- receiving, by the blockchain integrated station and from the certificate authority center, a digital certificate after the certificate authority center determines that the authentication request passes verification;
- sending, by the blockchain integrated station and based on the second network address, the digital certificate to the first blockchain node, wherein the digital certificate is to be used by the first blockchain node to add the blockchain integrated station as a new blockchain node in the blockchain network;
- receiving, by the blockchain integrated station, inquiry information from a second blockchain node in the blockchain network, wherein the inquiry information is generated and sent by the second blockchain node after discovering the blockchain integrated station; and
- sending, by the blockchain integrated station, the digital certificate to the second blockchain node, wherein the digital certificate is to be used by the second blockchain node to add the blockchain integrated station as the new blockchain node in the blockchain network by submitting a transaction and reaching consensus on the transaction to add the blockchain integrated station as the new blockchain node in the blockchain network.

2. The blockchain integrated station of claim 1, wherein the blockchain network is a dedicated network accessed by the blockchain integrated station via a tunnel.

3. The blockchain integrated station of claim 1, wherein:
the certificate authority center is comprised in the blockchain network; or
the certificate authority center is comprised in a public network outside the blockchain network.

4. The blockchain integrated station of claim 3, wherein:
if the certificate authority center is comprised in the blockchain network, the certificate authority center is a blockchain node which has initiated a certificate authority service in the blockchain network; and
if the certificate authority center is deployed in the public network outside the blockchain network, the certificate authority center is comprised in a Blockchain-as-a-Service (BaaS) platform in the public network.

5. The blockchain integrated station of claim 1, wherein the blockchain integrated station is added as the new blockchain node in the blockchain network by the second blockchain node without configuring the blockchain integrated station with a third network address of the second blockchain node for adding the blockchain integrated station as the new blockchain node in the blockchain network.

6. The blockchain integrated station of claim 1, wherein: the transaction is executed after a plurality of blockchain nodes in the blockchain network reach consensus on the transaction, wherein the blockchain integrated station is added as the new blockchain node by executing the transaction.

7. The blockchain integrated station of claim 1, wherein the blockchain integrated station comprises a cryptographic acceleration card that is used to perform at least one of a key management operation, an encryption and decryption operation, or a signature verification operation, wherein the blockchain integrated station further comprises at least one of an intelligent network card or a smart contract processing chip, and wherein the blockchain integrated station comprises at least one of a certificate authority service, a standardized on-cloud service interface, or a standardized cross-chain service interface.

8. A computer-implemented method comprising:
- receiving, by a blockchain integrated station, a configuration instruction input by a user after accessing a blockchain network, wherein the blockchain integrated station has not become a blockchain node in the blockchain network;
- configuring, by the blockchain integrated station and based on the configuration instruction, a first network address corresponding to a certificate authority center and a second network address corresponding to a first blockchain node in the blockchain network;
- initiating, by the blockchain integrated station, an authentication request to the certificate authority center based on the first network address;
- receiving, by the blockchain integrated station and from the certificate authority center, a digital certificate after the certificate authority center determines that the authentication request passes verification;
- sending, by the blockchain integrated station and based on the second network address, the digital certificate to the first blockchain node, wherein the digital certificate is to be used by the first blockchain node to add the blockchain integrated station as a new blockchain node in the blockchain network;
- receiving, by the blockchain integrated station, inquiry information from a second blockchain node in the blockchain network, wherein the inquiry information is generated and sent by the second blockchain node after discovering the blockchain integrated station; and
- sending, by the blockchain integrated station, the digital certificate to the second blockchain node, wherein the digital certificate is to be used by the second blockchain node to add the blockchain integrated station as the new blockchain node in the blockchain network by submitting a transaction and reaching consensus on the transaction to add the blockchain integrated station as the new blockchain node in the blockchain network.

9. The computer-implemented method of claim 8, wherein the blockchain network is a dedicated network accessed by the blockchain integrated station via a tunnel.

10. The computer-implemented method of claim 8, wherein:
the certificate authority center is comprised in the blockchain network; or
the certificate authority center is comprised in a public network outside the blockchain network.

11. The computer-implemented method of claim 10, wherein:
if the certificate authority center is comprised in the blockchain network, the certificate authority center is a blockchain node which has initiated a certificate authority service in the blockchain network; and if the certificate authority center is deployed in the public network outside the blockchain network, the certificate authority center is comprised in a Blockchain-as-a-Service (BaaS) platform in the public network.

12. The computer-implemented method of claim 8, wherein the blockchain integrated station is added as the new blockchain node in the blockchain network by the second blockchain node without configuring the blockchain integrated station with a third network address of the second blockchain node for adding the blockchain integrated station as the new blockchain node in the blockchain network.

13. The computer-implemented method of claim 8, wherein:
the transaction is executed after a plurality of blockchain nodes in the blockchain network reach consensus on the transaction, wherein the blockchain integrated station is added as the new blockchain node by executing the transaction.

14. The computer-implemented method of claim 8, wherein the blockchain integrated station comprises a cryptographic acceleration card that is used to perform at least one of a key management operation, an encryption and decryption operation, or a signature verification operation, wherein the blockchain integrated station further comprises at least one of an intelligent network card or a smart contract processing chip, and wherein the blockchain integrated station comprises at least one of a certificate authority service, a standardized on-cloud service interface, or a standardized cross-chain service interface.

15. A computer-implemented system, comprising:
one or more blockchain integrated stations; and
one or more computer memory devices coupled with the one or more blockchain integrated stations and having tangible, non-transitory, machine-readable media storing one or more instructions that, when executed by the one or more blockchain integrated stations, perform one or more operations comprising:
receiving, by a blockchain integrated station, a configuration instruction input by a user after accessing a blockchain network, wherein the blockchain integrated station has not become a blockchain node in the blockchain network;
configuring, by the blockchain integrated station and based on the configuration instruction, a first network address corresponding to a certificate authority center and a second network address corresponding to a first blockchain node in the blockchain network;
initiating, by the blockchain integrated station, an authentication request to the certificate authority center based on the first network address;
receiving, by the blockchain integrated station and from the certificate authority center, a digital certificate after the certificate authority center determines that the authentication request passes verification;
sending, by the blockchain integrated station and based on the second network address, the digital certificate to the first blockchain node, wherein the digital certificate is to be used by the first blockchain node to add the blockchain integrated station as a new blockchain node in the blockchain network;
receiving, by the blockchain integrated station, inquiry information from a second blockchain node in the blockchain network, wherein the inquiry information is generated and sent by the second blockchain node after discovering the blockchain integrated station; and
sending, by the blockchain integrated station, the digital certificate to the second blockchain node, wherein the digital certificate is to be used by the second blockchain node to add the blockchain integrated station as the new blockchain node in the blockchain network by submitting a transaction and reaching consensus on the transaction to add the blockchain integrated station as the new blockchain node in the blockchain network.

16. The computer-implemented system of claim 15, wherein the blockchain network is a dedicated network accessed by the blockchain integrated station via a tunnel.

17. The computer-implemented system of claim 15, wherein:
the certificate authority center is comprised in the blockchain network; or
the certificate authority center is comprised in a public network outside the blockchain network.

18. The computer-implemented system of claim 17, wherein:
if the certificate authority center is comprised in the blockchain network, the certificate authority center is a blockchain node which has initiated a certificate authority service in the blockchain network; and
if the certificate authority center is deployed in the public network outside the blockchain network, the certificate authority center is comprised in a Blockchain-as-a-Service (BaaS) platform in the public network.

19. The computer-implemented system of claim 15, wherein the blockchain integrated station is added as the new blockchain node in the blockchain network by the second blockchain node without configuring the blockchain integrated station with a third network address of the second blockchain node for adding the blockchain integrated station as the new blockchain node in the blockchain network.

20. The computer-implemented system of claim 15, wherein:
the transaction is executed after a plurality of blockchain nodes in the blockchain network reach consensus on the transaction, wherein the blockchain integrated station is added as the new blockchain node by executing the transaction.

\* \* \* \* \*